March 24, 1936.  A. KOTTMANN  2,035,322
CALCULATING MACHINE WITH AUTOMATIC MULTIPLYING DEVICE
AND WITH RESULT AND TOTALIZING REGISTERS
Filed Oct. 24, 1931  4 Sheets-Sheet 1
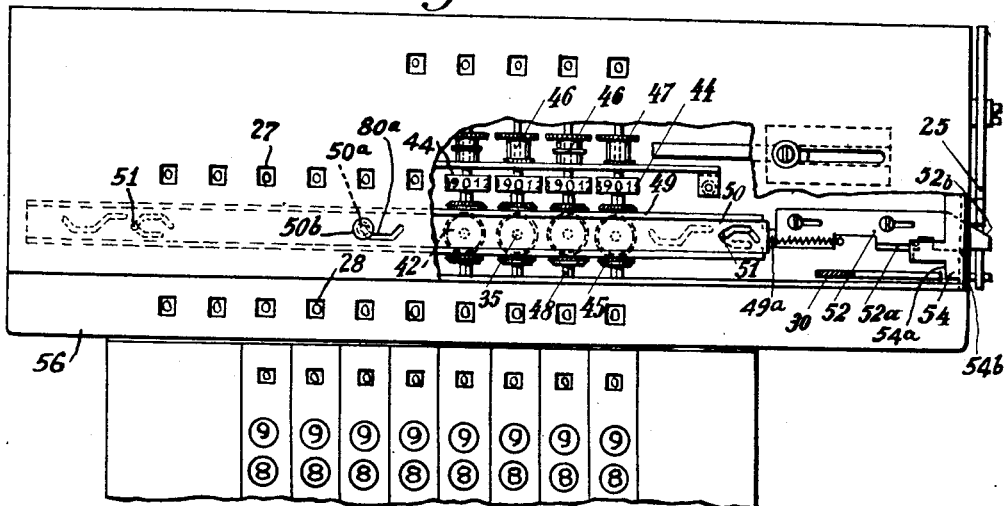
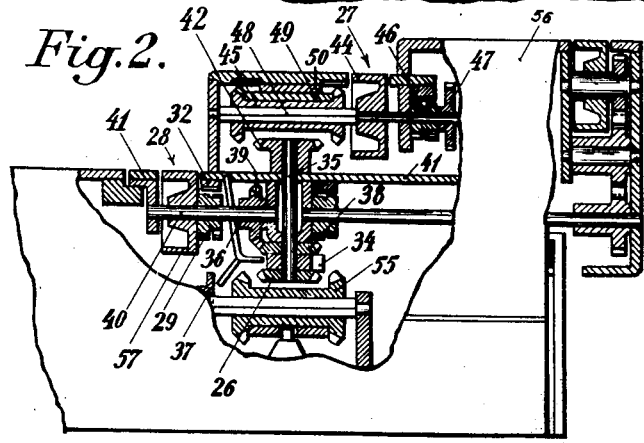
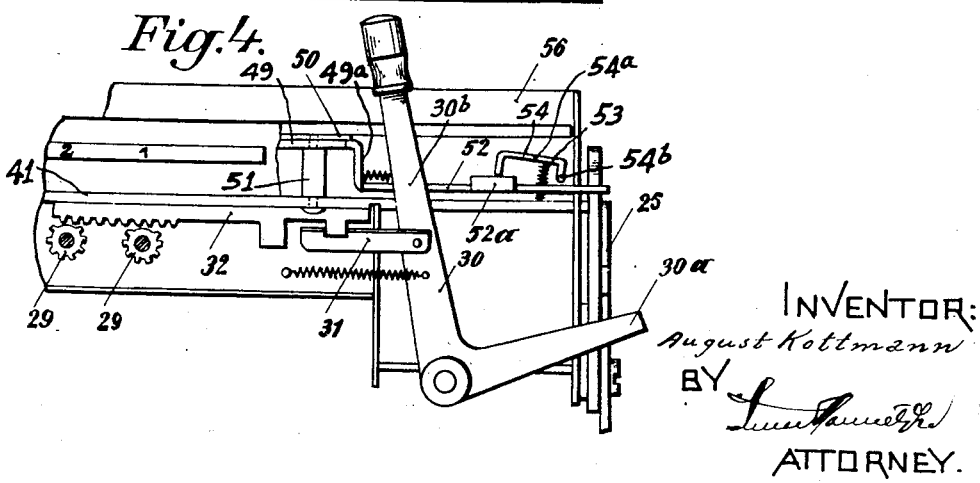
INVENTOR:
August Kottmann
BY
ATTORNEY.

March 24, 1936.  A. KOTTMANN  2,035,322
CALCULATING MACHINE WITH AUTOMATIC MULTIPLYING DEVICE
AND WITH RESULT AND TOTALIZING REGISTERS
Filed Oct. 24, 1931   4 Sheets-Sheet 2
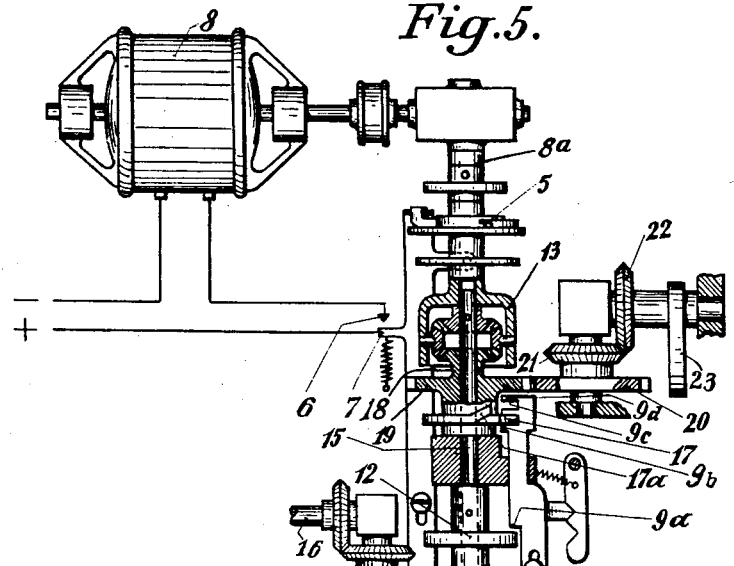
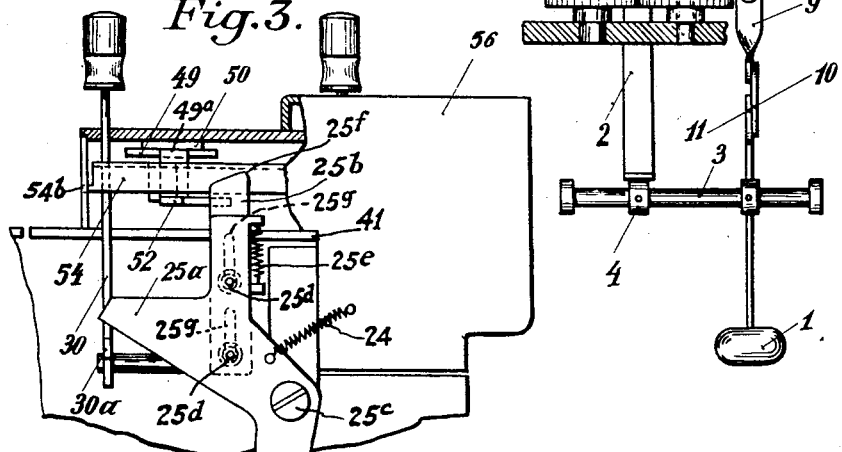
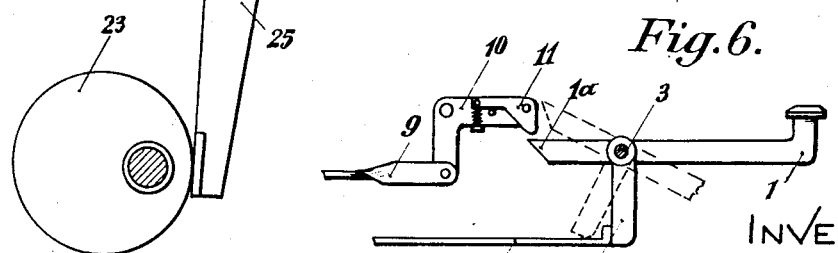
INVENTOR
August Kottmann
BY
ATTORNEY.

March 24, 1936.  A. KOTTMANN  2,035,322
CALCULATING MACHINE WITH AUTOMATIC MULTIPLYING DEVICE
AND WITH RESULT AND TOTALIZING REGISTERS
Filed Oct. 24, 1931   4 Sheets-Sheet 3
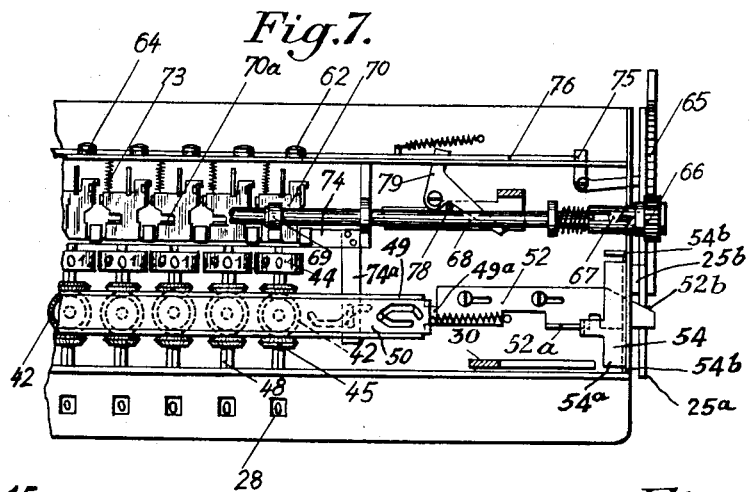
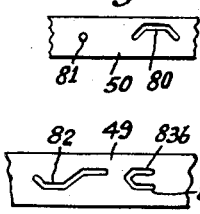
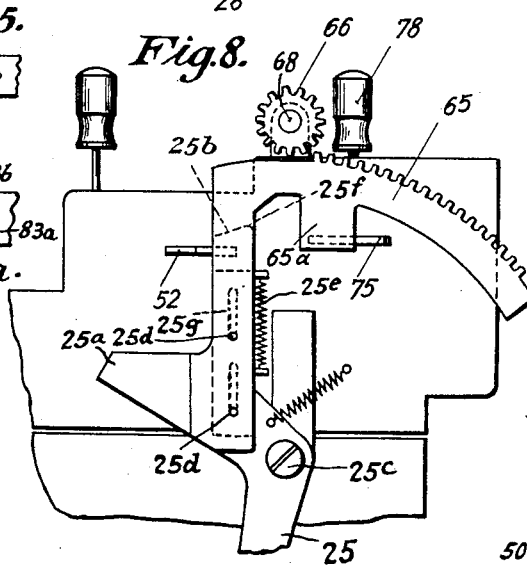
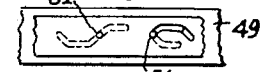
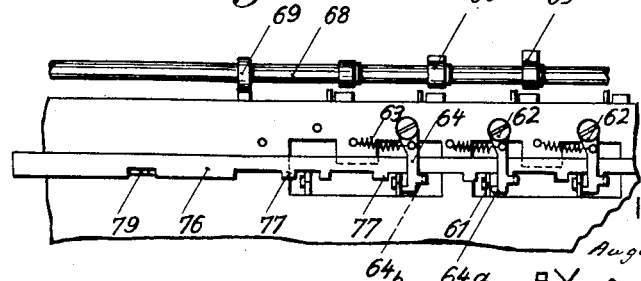
INVENTOR:
August Kottmann
BY
ATTORNEY.

March 24, 1936.   A. KOTTMANN   2,035,322
CALCULATING MACHINE WITH AUTOMATIC MULTIPLYING DEVICE
AND WITH RESULT AND TOTALIZING REGISTERS
Filed Oct. 24, 1931   4 Sheets-Sheet 4
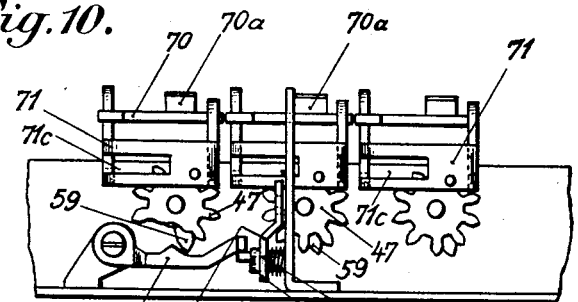
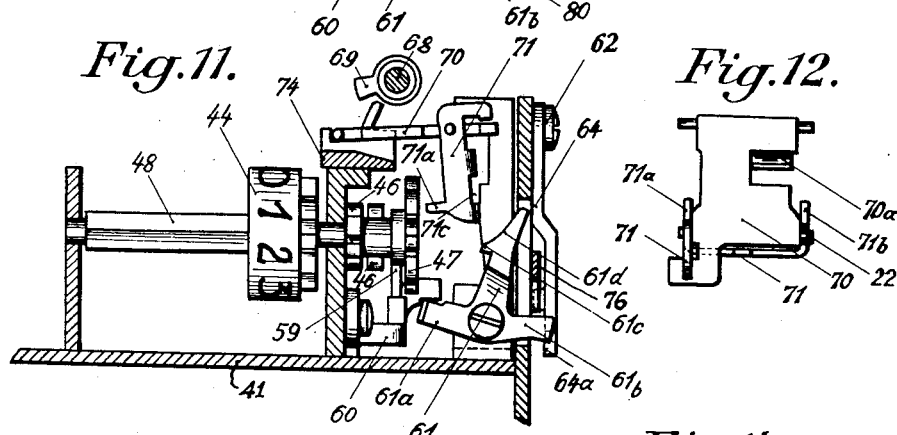
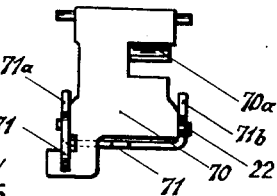
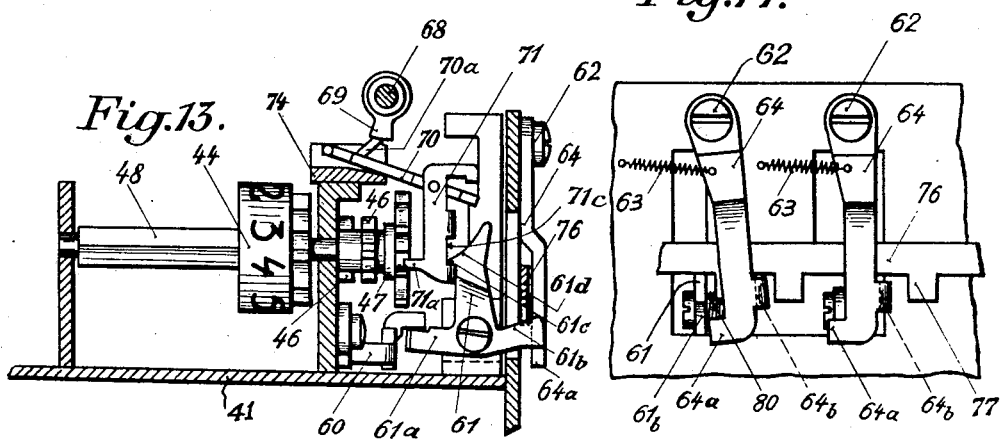
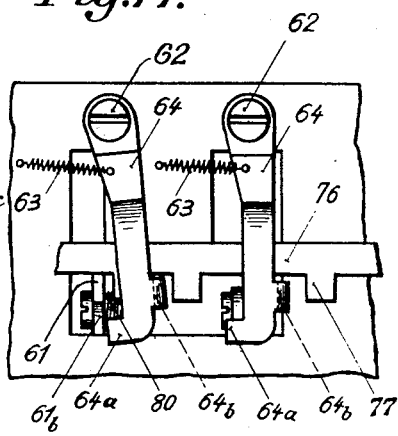
INVENTOR:
August Kottmann
BY
ATTORNEY.

Patented Mar. 24, 1936

2,035,322

UNITED STATES PATENT OFFICE 2,035,322

CALCULATING MACHINE WITH AUTOMATIC MULTIPLYING DEVICE AND WITH RESULT AND TOTALIZING REGISTERS

August Kottmann, Sommerda, Germany, assignor to Rheinische Metallwaaren und Maschinenfabrik Sommerda Aktiengesellschaft, Sommerda, Germany, a corporation of Germany Application October 24, 1931, Serial No. 570,922
In Germany November 4, 1930

3 Claims. (Cl. 235—75)

In known calculating machines having automatic multiplying devices and with result and totalizing registers with a motor driven device for transferring the individual amounts from the result registers to the totalizing registers, it is necessary to actuate a special key, in order to connect the transfer mechanism with the driving motor. In the course of calculation it may occur that the operation of this key, which causes the engagement of the transfer device, is inadvertently omitted, whereby errors then occur.

In the calculating machines in accordance with the invention an arrangement is provided which first connects the drive motor with the transfer mechanism upon depressing the multiplication key, that is, every time that the machine is set into operation for carrying out a multiplication, and only then shifts the connection to the main drive shaft of the calculating machine. The device is put in operation when a relatively large number of multiplications is carried out in uninterrupted succession by means of the machine, and the computed products are transferred in each case into the totalizing register. Thus by this device, each time the machine is set into operation to carry out a calculation, the previously calculated product is first transferred into the totalizing register and the calculating operation is carried out only then. As long as the device of the present invention is in operation, thus the transfer of the previous result into the totalizing register always takes place with certainty before carrying out the new calculating operation.

An exemplary embodiment of the invention is illustrated in the drawings wherein:

Fig. 1 is a plan view of the registers and the portions of the clearing and transfer mechanism supported in the register carriage, in accordance with the invention;

Fig. 2 is a partly sectional side elevation of the register carriage;

Fig. 3 is a side elevation of the drive mechanism of the clearing and transfer mechanism;

Fig. 4 is a front elevation corresponding to Fig. 3;

Fig. 5 is a partly sectional elevation of the motor drive means for the register operating mechanism of the calculating machine and the zero setting and transfer mechanism;

Fig. 6 is a side elevation of the motor key;

Fig. 7 is a plan view, partly broken away, of the tens transfer mechanism of the totalizing register;

Fig. 8 is a side elevation of the device in accordance with Fig. 7;

Fig. 9 is a rear elevation of the device in accordance with Fig. 7;

Figs. 10 to 14 are details of the tens transfer device, namely Figs. 10 and 14 in rear elevations, Figs. 11 and 13 in side elevations, and Fig. 12 in plan view; and Figs. 15 to 18b are fragmentary top views illustrating cam slots.

After the setting of the two factors into the machine, the motor engaging key 1 (Figs. 5 and 6) is depressed, whereby the controlling slide 2 is shifted by means of the shaft 3 and the intermediate lever 4, and thus the clutch 5 is engaged and the contact device 6, 7 is closed, so that the motor 8 will drive the shaft 8a and the differential 13.

Simultaneously the intermediate elements 10 and 11 and the locking slide 9 are moved by the extension 1a of the key 1. Said locking slide 9 cooperates with the locking disc 12 of the shaft 15 and the locking disc 17 of the hollow shaft 18 of the differential 13 driven by the motor.

In its normal position the slide 9 locks the locking disc 17 and the hollow shaft 18. By actuating the motor key 1 the slide 9 is pushed forward in such manner that its projecting lug 9a engages in a radial slot of the locking disc 12, and the projection 9b is moved out of the radial slot of the locking disc 17. The locking disc 17 now rotates in the slot 9c of the slide 9. The radial slot illustrated in Fig. 5 upon the front side of the locking disc 17, and the lug 17a are in fact displaced 90° with respect to one another for in the illustrated position of the locking slide 9, the latter lies in the slot located adjacent the lug 17a. The slot and the lug are shown displaced 90° from one another, in order to show both of them more clearly.

After the shifting of the locking slide 9 the locking disc 12 and the shaft 15 of the differential 13 are locked, while on the contrary the locking disc 17 together with the gear wheel 19 are free and are driven by the differential 13. The motion is transmitted through the spur gear 20 and the bevel gears 21, 22, to the excentric disc 23.

The excentric disc 23 in turn, in cooperation with a spring 24 (Fig. 3), sets a lever 25 secured to the register carriage into a reciprocating swinging movement. As will be later described in detail, the lever 25 actuates the zero setting means of the totalizing register. It may also simultaneously move the zero setting means of the rotation or quotient register.

In the exemplary embodiment illustrated, the lever 25 is in engagement with the excentric disc 23 only when the register carriage is in the normal position. This is sufficient for completely automatic multiplying calculating machines wherein, on the one hand, the multiplying device is so arranged that multiplications are carried out beginning with the lowest digit of the multiplier, and which on the other hand are provided with an automatic carriage return, which after the completion of each multiplication again returns the carriage into the normal position; for in such machines the register carriage, at the beginning of each multiplication, is located in its normal position.

The product register mechanism 28 (Figs. 1 and 2) supported in the register carriage 56 is driven in known manner by stepped rollers, as described in U. S. Patent No. 1,641,615 of September 6, 1927, through double bevel gears 55. The transfer of motion to the number rolls 57 of the product register is accomplished by means of bevel gears 26, shafts 35, bevel gears 38 and 39 and shafts 40.

Tens setting lugs 34, which are secured to the shafts 35, in case of tens transfer move so-called setting flaps 36, which in turn so shift the tens shifting wheels 37 that they come into engagement with the tens shifting lugs (as shown in the above cited patent) of the stepped rollers.

Bevel gears 42 are arranged upon the extension of the shaft 35 beyond the plate 41 of the register carriage. The double bevel gears 45 are arranged shiftably, but nonrotatably upon the shafts 48 of the number rolls 44 of the totalizing register 27. If these double bevel gears 45 are brought into engagement with the bevel gear 42, and if thereupon the result register 28 is set to zero, then the amount contained in the result register is transferred into the totalizing register.

The bevel wheels 42 and 45 are brought out of and into gear by a cam mechanism shown in Figs. 15, 16a, 17a, 17b, 18a, and 18b, comprising cam slots formed in the bars 49, 50 (Figs. 1, 2, 3, 4, 7). The bar 50 (Fig. 15) has a slot 80 and a pin 81 secured in a hole in the bar and extending backwards from said bar as shown in Fig. 15, and the bar 49 (Fig. 16a) has two slots 82 and 83, the latter having two branches 83a and 83b. The bars 49, 50 are provided at both ends with slots, as shown in Figs. 15–18b, and are guided by the pins 51 (Figs. 1, 4, 7) fixed in the plate 41 (Fig. 4) of the accumulator carriage. The pins 51 engage the slots 83 of the bar 49 and the slots 80 of the bar 50. Also the pin 81 of the bar 50 co-operates with the slot 83 of the bar 49.

In the cover plate of the accumulator slide there is formed, as shown in Fig. 1, a slot 80a which is an inverted duplicate of the slot 80, through which slot 80a extends a pin 50a fixed in the bar 50 and having a head 50b. In Fig. 1 the pin 50a stands at the left hand end of the slot 80a and by means of the head 50b it can be moved until the pin stands in the right hand end of the slot 80a, the bar being guided by its slots 80 engaging the pins 51. The bar 50 can thus be set in two different positions. If the pin 50 stands in the left end of the slot 80a, the cam mechanism (79—83) is so prepared that it brings the bevel gears 42, 45 into mesh for additive product transfer. If the pin 50 stands in the right end of the slot 80a the cam mechanism is so prepared that a subtractive transfer occurs.

By shifting the bar 50 a bar 74 is simultaneously shifted by means of the cross-bars 74a, whereby, as hereafter described, the tens-carrying devices are set for additive or subtractive transfer. The setting of the bar 50, and therefore the preparation of the product transfer mechanism for additive or subtractive transfer, always takes place while the machine is not operating, that is before the beginning of a multiplication.

If the bar 50, as shown in Figs. 1, 18a, 18b, stands in its left end position, the pin 81 of the bar 50 will stand in the left part of the slot portion 82a. If the bar 49 is now moved somewhat to the left, the bar 50 remaining stationary, the bar 49 will be shifted slightly upwardly by means of the pin 81 and the slot portion 82a (Fig. 18b) and carries with it the double bevel gears 45, whereby the bevel gears 42, 45 come into mesh with each other and the number rolls 57, 44 are coupled for additive transfer of products. The bar 49 in this movement is guided by the slots 83a and the pins 51.

If the bar 50 stands in its right end position, the pin 81 of the bar 50, as shown in Fig. 17, will stand in the left part of the slot portion 82b, and when the bar 49 is shifted to the left it is moved downwards by the pin 81 and slot portion 82b (Fig. 17b), bringing the bevel gears 45, 42 into mesh for subtractive transfer of products. The bar 49 in this movement is guided by the slots 83b and the pins 51.

The pins 81 and the slot portions 82a and 82b thus form the most essential parts of the cam mechanism.

The bar 49 is actuated by a slide 52 (Figs. 1, 3, 4, 7, 8) having ramps 52b extending into the path of movement of the slide 25b which is attached to the lever 25 by means of a pin and slot connection 25d, 25g, and is drawn upwardly by a spring 25e (Figs. 3 and 8).

The lever 25, by each rotation of the eccentric 23 (Figs. 3 and 5), is rocked once to and fro about the pivot 25c. In the first half turn of the eccentric the lever rocks counter-clockwise, and this movement is designated as the product transfer stroke. In the second half turn of the eccentric 23 the lever 25 rocks back to its initial position, which movement is designated as the tens-carrying stroke.

At the beginning of the product transfer stroke the slide 25b contacts with the ramp 52b.

The slide 52 and the bar 49 are accordingly shifted to the left (Figs. 1 and 7), whereby, as already stated, the bevel gears 42 and 45 will be put into mesh with one another. The number rolls 57 of the product mechanism 28 are then in connection with the number rolls 44 of the totalizing register 27, by means of shaft 40, bevel gears 38 and 39, shaft 35, reverse gears 42 and 45 and shaft 48.

Shortly before the slide 52 which is moved by the transfer lever 25 reaches its left hand end position (Figs. 1 and 7), a latch 54, which is pivotally connected by pin 54b to the frame of the register carriage (Figs. 1, 3, 4 and 7) and is under the influence of a spring 53, (Fig. 4) will become arranged behind a projection 52a and will hold the slide 52 and the bevel gears 42 and 45 stationary in the position which has been imparted to them.

After the number rolls of the two registers have thus been connected together in pairs, the arm 25a (Fig. 3) of the lever 25 will strike the arm 30a of the clearing lever 30, which moves the clearing rack bar 32 by means of the shifting element 31. The clearing rack bar in turn engages into the zero setting wheels 29 and sets the number wheels 57 of the product register 28 to zero. Inasmuch as the number rolls of the registers 27 and 28 are connected in pairs, simultaneously with the zero setting of the product register, the transfer of the numerical values contained therein takes place into the totalizing register.

After carrying out the result transfer the lock 54 is released by the clearing lever 30, which carries out a further supplemental stroke after the clearing, the lever 30 strikes against the edge 54a of the lock 54 and releases it by turning it around its pin 54b whereby the slide 52 and the bar 49 are again moved under spring action to the right (Figs. 1 and 7), the meshing of the bevel gears 42 and 45, and the connecting of the number rolls 44 and 57, are consequently eliminated.

If a number roll 44 of the totalizing register 27 is turned from "nine" to "zero" or vice versa, thus if a tens transfer becomes necessary to the number roll of the next higher place, then the tens setting finger 59 (Figs. 10 and 11) of the number roll which is turned from "nine" to "zero" will force a pawl 60 downwards, and this in turn presses upon the arm 61a (Figs. 10, 11 and 13) of a further pawl 61 belonging to the number roll of the next higher place of the register and shifts the latter to such extent that a latch 64 rotatable about 62 and actuated by the spring 63 (Fig. 14) will grip with its bent portion 64a under the lug 61b of the pawl 61 and hold the latter tight in the swung position. Thereby the tens transfer is prepared for.

The impulses of power and movement necessary for carrying out the tens transfers are derived from the transfer lever 25 by means of the segment 65 (Figs. 7 and 8), the gear wheel 66, the free running clutch 67 and the shaft 68. The free running clutch 67 provides that the tens shifting shaft 68 may not be turned during the result transfer stroke of the lever 25. If on the other hand during the tens carrying stroke the lever 25 and the toothed segment 65 arranged upon the same swing back (that is, to the right in Fig. 8), then the free running clutch 67 will become engaged and the tens shifting shaft will be rotated. A number of lugs 69 (Figs. 9, 11 and 13) are attached to the tens shifting shaft 68, and staggered with respect to one another, corresponding in number to the number of number rolls, which upon rotary movement of the shaft 68 press against the bent tongues 70a (Figs. 10, 12 and 13) corresponding to them, of the tens shifting flaps 70, and thereby move the latter downwardly. If now a tens transfer has been prepared for in one place of the totalizing register, that is, if the pawl 61 has been swung by the tens shifting finger 59 of the next lower number roll with the assistance of a pawl 60, then upon the downward movement of the tens shifting flap 70 produced by the tens shifting lug 69, the shifting element 71 hinged thereto and hanging downwardly will be forced by the incline 61d (Figs. 11 and 13) of the pawl 61 together with one of the two projections 71a or 71b, into a tooth space of the tens shifting wheel 47 lying opposite the same, so that upon further downward movement of the tens shifting flap 70, 71 the gear wheel 47 will be turned further a space corresponding to one unit, together with the corresponding number wheel 44. If the tens shifting flap 70, 71 has reached such a depressed position that the tens shifting has been carried out, then the notch 71c will be positioned in front of the lug 61c of the pawl 61, so that the shifting element 71 which has been pushed forward by the incline 61d will swing back to a certain extent and will become positioned in a lower strip below the lug 61c, whereby the shifting element 61 is locked in its lowermost position.

In those places of the totalizing register wherein no tens transfer has been prepared for, the tens shifting flap will be depressed inactively by the corresponding tens shifting lugs, but will immediately thereafter again jump back into a normal position due to the tension of the spring 73 (Fig. 7). The bar 74 (Figs. 7, 11, and 13) upon which are set all the tens shifting flaps 70 together with the shifting elements 71, is shiftable longitudinally, and may be set into two positions. In one position the projection 71a will come into engagement with the tens shifting wheel 47, and in the other position the projection 71b will come into such engagement. The tens shifting wheel and the number roll will be forced in one case in the additive direction and in the other case in the subtractive direction. The bar 74 is by a cross beam 74a (Fig. 7) rigidly connected to the bar 50, by the longitudinal shifting of which the cam mechanism, which brings the bevel gears 42 and 45 into and out of engagement with one another, is set for additive or subtractive transfer. The cam mechanism 49 and 50, and the tens shifting means are therefore always reversed simultaneously.

When the tens shifting has been completed and the transfer lever 25 again approaches its initial position, the gear segment 65 by means of the lug 65a will swing out of position an angle lever 75 (Figs. 7 and 8). Thereby the bar 76 (Figs. 7, 9 and 14) will be so shifted that by abutting with its tongues 77 against the projections 64b of the locking pawls 64, it takes the latter along. The locking of the pawls 61 is thereby eliminated, and the pawls 60 are allowed to return from their preparing position to their initial position. All the remaining tens shifting means also return to their initial positions together with them.

The entire clearing and transfer procedure takes place as follows: During the first part of the rotation of the cam disc 23 the lower end of the transfer lever 25 is gradually forced to the right (Fig. 3) whereby the transfer lever 25 first forces the slide 52 and the bar 49 to the left (Figs. 1 and 7) by means of the slide 25b secured to its upper end against the incline 52b. Thereby the product register 28 becomes connected with the totalizing register 27. Upon further swinging the transfer lever 25 will become positioned with a projection 25a against one arm 30a of the clearing lever 30 and will depress the latter, whereby the clearing of the product register 28 and thereby also the transfer of the result into the totalizing register will be carried out. Shortly before the completion of the first half rotation of the cam disc 23 the clearing lever 30 will arrive with its other arm 30b against the locking lever 54, will lift the latter, thus unlocking the bar 49 and thereby also releasing the connection between the number rolls of the result and totalizing registers through the bevel gears 42 and 45. During the second half of the rotation of the cam disc all the elements return to their original positions, and thereby the gear segment 65 will move the shaft 68 which drives the tens transfer mechanism of the totalizing register.

While the cam disc 23 is approaching the completion of an entire rotation, a lug 17a provided upon the locking element 17, and abutting against the projection 9d of the slide 9 will shift the locking slide 9 in such manner that the same will hold the locking element 17 tight and will eliminate the locking of the disc 12. Thereby all the clearing and transfer elements for the registers are locked and the motion transmission from the motor to the main drive shaft 16 is freed, so that now, after completion of the clearing and the transfer of the preceding product into the totalizing register, the next multiplication may be carried out.

The shaft 16 is the main drive shaft of the calculating machine.

By retraction of the locking slide 9 and intermediate element 10 with its link 11, the motor key 1 will not be set back, for the reason that upon depressing the key 1 its extension 1a will slide off from the head of the link 11 after the key has swung the element 10 through a certain distance, and will thus move out of the path of movement of the parts 10 and 11, (Fig. 6). After completing the multiplication, the key which will be freed from the multiplication device, not shown, and the arm 1a will again be set under the head of the link 11 by a swinging motion of the latter.

The slide 25b and the rack segment 65 are connected with the lever 25 by screws 25d. The slide 25b is guided by the slot 25g on this screw and is drawn upwardly by the spring 25e. In the return stroke of the lever 25 (tens-carrying stroke) the pin 25f of the slide 25b strikes the under side of the slide 52 and is forced upwardly. The slide 52 therefore is not affected by the tens-carrying stroke.

As will be understood from the preceding description, the differential gear 13 functions as a change-over mechanism for transmitting the rotation of the motor driven shaft 8a first to the shaft 18 actuating the result transfer mechanism and then to the main drive shaft 16 of the calculating machine.

The slide 9 serves as a control member which upon depression of the motor key 1 controlling the motor drive for multiplication is so shifted that the change-over mechanism 13 transmits the motion of the motor driven shaft 8a to the shaft 18 of the result transfer mechanism. After this shaft 18 almost completes its first revolution, a shifting member 17a, operated thereby, so sets the control member 9 that the change-over mechanism 13 transmits the motion of the motor driven shaft 8a to the main drive shaft 16 of the machine.

I claim as my invention:—

1. A calculating machine comprising calculating mechanism including an automatic multiplying device, a product register, and a total register; means for transferring products from the product register to the total register; motor drive means including connections to both the calculating mechanism and the product transfer means; reversible means movable in one direction to render effective only the connections to the transfer means and in the other direction to render effective only the connections to the calculating mechanism; a key operable to move said reversible means in the first direction; and means for automatically moving said reversible means in the other direction upon completion of a transfer as a consequence of said key operation.

2. A calculating machine comprising an automatic multiplying mechanism, a product register, a total register, means for effecting transfer of a product from the product register to the total register, a motor drive including connections between the motor and both the multiplying mechanism and the transfer means, key controlled means for rendering effective the connections of the motor to the transfer means and simultaneously rendering ineffective the connections of the motor to the multiplying mechanism, and means operated automatically only upon completed transfer of a product by said key controlled means to render effective the connections of the motor to the multiplying mechanism and simultaneously render ineffective the connections to the transfer means.

3. In an automatic multiplying machine comprising calculating mechanism, a product register, a total register, means for transferring products from the products register to the total register, a motor, and a key controlling the switching in of the motor to perform multiplication; the arrangement of drive transmission mechanism having parts adapted to be connected respectively to the calculating mechanism and the products transfer means, means moved by the motor key to cause the motor to drive the parts of transmission mechanism connected with the products transfer means, and means for automatically changing the drive of the motor to the parts of the transmission mechanism connected with the calculating mechanism upon completion of a transfer resulting from said key operation.

AUGUST KOTTMANN.